United States Patent
Katzir et al.

(10) Patent No.: US 10,491,609 B2
(45) Date of Patent: Nov. 26, 2019

(54) SYSTEM AND METHOD FOR GENERATING DATA SETS FOR LEARNING TO IDENTIFY USER ACTIONS

(71) Applicant: Verint Systems Ltd., Herzliya Pituach (IL)

(72) Inventors: Ziv Katzir, Even Yehuda (IL); Gershon Celnicker, Herzliya Pituach (IL); Hed Kovetz, Herzliya Pituach (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 226 days.

(21) Appl. No.: 15/725,069

(22) Filed: Oct. 4, 2017

(65) Prior Publication Data

US 2018/0109542 A1    Apr. 19, 2018

(30) Foreign Application Priority Data

Oct. 10, 2016  (IL) .......................................... 248306

(51) Int. Cl.
 *H04L 29/06*  (2006.01)
 *G06N 20/00*  (2019.01)

(52) U.S. Cl.
 CPC ......... *H04L 63/1408* (2013.01); *G06N 20/00* (2019.01); *H04L 63/306* (2013.01); *H04L 63/0227* (2013.01); *H04L 63/0428* (2013.01)

(58) Field of Classification Search
 CPC ............... H04L 63/306; H04L 63/1408; H04L 63/0428; H04L 63/0227; H04L 63/0823;
 (Continued)

(56) References Cited

U.S. PATENT DOCUMENTS 5,689,442 A  11/1997 Swanson et al.
6,404,857 B1  6/2002 Blair et al.
(Continued)

FOREIGN PATENT DOCUMENTS

EP  0989499  3/2000
EP  2104044  9/2009
EP  2437477  4/2012

OTHER PUBLICATIONS

Aho, Alfred V., et al., "Efficient String Matching: An Aid to Bibliographic Search," Communication of the ACM, Jun. 1975, vol. 18, No. 6, pp. 333-340.
(Continued)

*Primary Examiner* — Le H Luu
(74) *Attorney, Agent, or Firm* — Meunier Carlin & Curfman LLC (57) ABSTRACT

Embodiments for generating appropriate data sets for learning to identify user actions. A user uses one or more applications over a suitable period of time. As the user uses the applications, a monitoring device, acting as a "man-in-the-middle," intermediates the exchange of encrypted communication between the applications and the servers that serve the applications. The monitoring device obtains, for each action performed by the user, two corresponding (bidirectional) flows of communication: an encrypted flow, and an unencrypted flow. Since the unencrypted flow indicates the type of action that was performed by the user, the correspondence between the encrypted flow and the unencrypted flow may be used to automatically label the encrypted flow, without decrypting the encrypted flow. Features of the encrypted communication may then be stored in association with the label to automatically generate appropriately-sized learning set for each application of interest.

20 Claims, 3 Drawing Sheets

(58) Field of Classification Search
CPC ... H04L 63/0869; H04L 47/10; H04L 9/0631;
H04L 9/08; H04L 9/3236; H04L 9/3247;
G06N 20/00; G06F 21/10; G06F 21/80;
H04W 12/0013
See application file for complete search history.

(56) References Cited

U.S. PATENT DOCUMENTS

| | | | |
|---|---|---|---|
| 6,718,023 | B1 | 4/2004 | Zolotov |
| 6,741,992 | B1 | 5/2004 | McFadden |
| 6,757,361 | B2 | 6/2004 | Blair et al. |
| 7,134,141 | B2 | 11/2006 | Crosbie |
| 7,216,162 | B2 | 5/2007 | Amit et al. |
| 7,225,343 | B1 | 5/2007 | Honig et al. |
| 7,287,278 | B2 | 10/2007 | Liang |
| 7,466,816 | B2 | 12/2008 | Blair |
| RE40,634 | E | 2/2009 | Blair et al. |
| 7,587,041 | B2 | 9/2009 | Blair |
| 7,650,317 | B2 | 1/2010 | Basu et al. |
| 7,941,827 | B2 | 5/2011 | John |
| 8,005,897 | B1 | 8/2011 | Roka et al. |
| RE43,103 | E | 1/2012 | Rozman et al. |
| 8,176,527 | B1 | 5/2012 | Njemanze et al. |
| 8,201,245 | B2 | 6/2012 | Dewey et al. |
| RE43,528 | E | 7/2012 | Rozman et al. |
| RE43,529 | E | 7/2012 | Rozman et al. |
| 8,224,761 | B1 | 7/2012 | Rockwood |
| RE43,987 | E | 2/2013 | Rozman et al. |
| 8,402,543 | B1 | 3/2013 | Ranjan et al. |
| 8,413,244 | B1 | 4/2013 | Nachenberg |
| 8,499,348 | B1 | 7/2013 | Rubin |
| 8,578,493 | B1 | 11/2013 | McFadden |
| 8,682,812 | B1 | 3/2014 | Ranjan |
| 8,762,948 | B1 | 6/2014 | Zaitsev |
| 8,838,951 | B1 | 9/2014 | Hicks et al. |
| 8,839,417 | B1 | 9/2014 | Jordan |
| 8,850,579 | B1 | 9/2014 | Kalinichenko |
| 8,869,268 | B1 | 10/2014 | Barger |
| 9,225,829 | B2 | 12/2015 | Agúndez Dominguez et al. |
| 2002/0129140 | A1 | 9/2002 | Peled et al. |
| 2003/0078058 | A1* | 4/2003 | Vatanen ............... H04L 9/3247 455/466 |
| 2003/0097439 | A1 | 5/2003 | Strayer et al. |
| 2004/0148399 | A1* | 7/2004 | Fenizia ................. G06F 21/10 709/227 |
| 2004/0221160 | A1* | 11/2004 | Douceur ............... H04L 9/3236 713/176 |
| 2005/0018618 | A1 | 1/2005 | Mualem et al. |
| 2005/0065889 | A1* | 3/2005 | Benaloh ................ G06F 21/10 705/51 |
| 2007/0180509 | A1 | 8/2007 | Swartz et al. |
| 2007/0186284 | A1 | 8/2007 | McConnell |
| 2007/0192863 | A1 | 8/2007 | Kapoor et al. |
| 2007/0294768 | A1 | 12/2007 | Moskovitch et al. |
| 2008/0014873 | A1 | 1/2008 | Krayer et al. |
| 2008/0028463 | A1 | 1/2008 | Dagon et al. |
| 2008/0069437 | A1 | 3/2008 | Baker |
| 2008/0184371 | A1 | 7/2008 | Moskovitch et al. |
| 2008/0196104 | A1 | 8/2008 | Tuvell et al. |
| 2008/0222127 | A1 | 9/2008 | Bergin |
| 2008/0261192 | A1 | 10/2008 | Huang et al. |
| 2008/0267403 | A1 | 10/2008 | Boult |
| 2008/0285464 | A1 | 11/2008 | Katzir |
| 2009/0106842 | A1 | 4/2009 | Durie |
| 2009/0150999 | A1 | 6/2009 | Dewey et al. |
| 2009/0271370 | A1 | 10/2009 | Jagadish et al. |
| 2010/0091650 | A1* | 4/2010 | Brewer, Jr. ............. H04L 47/10 370/229 |
| 2010/0177901 | A1* | 7/2010 | Bates ..................... G06F 21/80 380/278 |
| 2010/0306185 | A1 | 12/2010 | Smith et al. |
| 2012/0093312 | A1* | 4/2012 | Gammel ............... H04L 9/0631 380/255 |
| 2012/0110677 | A1 | 5/2012 | Abendroth et al. |
| 2012/0218939 | A1* | 8/2012 | Walke ................. H04L 63/0428 370/328 |
| 2012/0222117 | A1 | 8/2012 | Wong et al. |
| 2012/0304244 | A1 | 11/2012 | Xie et al. |
| 2012/0311708 | A1 | 12/2012 | Agarwal et al. |
| 2012/0331556 | A1 | 12/2012 | Alperovitch et al. |
| 2013/0014253 | A1 | 1/2013 | Neou |
| 2013/0096917 | A1 | 4/2013 | Edgar et al. |
| 2013/0144915 | A1 | 6/2013 | Ravi et al. |
| 2013/0151616 | A1 | 6/2013 | Amsterdamski |
| 2013/0191917 | A1 | 7/2013 | Warren et al. |
| 2013/0333038 | A1 | 12/2013 | Chien |
| 2014/0059216 | A1 | 2/2014 | Jerrim |
| 2014/0075557 | A1 | 3/2014 | Balabine et al. |
| 2014/0207917 | A1 | 7/2014 | Tock et al. |
| 2014/0214687 | A1* | 7/2014 | Huxham ........... H04W 12/0013 705/70 |
| 2014/0298469 | A1 | 10/2014 | Marion et al. |
| 2015/0100780 | A1* | 4/2015 | Rubin ................. H04L 63/0823 713/157 |
| 2015/0135326 | A1 | 5/2015 | Bailey, Jr. |
| 2015/0149778 | A1* | 5/2015 | Nakano ............... H04L 63/0869 713/169 |
| 2015/0215429 | A1 | 7/2015 | Weisblum et al. |
| 2017/0272407 | A1* | 9/2017 | Huang ..................... H04L 9/08 |

OTHER PUBLICATIONS

Altshuler, Y., et al., "How Many Makes a Crowd? On the Evolution of Learning as a Factor of Community Coverage," LNCS 7227, 2012, pp. 43-52.
Altshuler, Y., et al., "Incremental Learning with Accuracy Prediction of Social and Individual Properties from Mobile-Phone Data," IEEE, 2011, 10 pages.
Altshuler, Y., et al., "Trade-Offs in Social and Behavioral Modeling in Mobile Networks," LNCS 7812, 2013, pp. 412-423.
Argamon, S., et al., "Automatically Profiling the Author of an Anonymous Text," Communication of the ACM, vol. 52, No. 2, Feb. 2009, pp. 119-123.
Argamon, S., et al., "Gender, Genre, and Writing Style in Formal Written Texts," Text & Talk, vol. 23, Issue 3, 2003, 32 pages.
Atkinson, M., et al., "Near Real Time Information Mining in Multilingual News," World Wide Web Conference, Apr. 20-24, 2009, 2 pages.
Bilge, Leyla, et al., "EXPOSURE: Finding Malicious Domains Using Passive DNS Analysis," Feb. 2011, 17 pages.
Blum, A., et al., "Combining Labeled and Unlabeled Data with Co-Training," School of Computer Science, Carnegie Mellon University, Proceedings of the Eleventh Annual Conference on Computational Learning theory (COLT'98), 1998, pp. 92-100.
Chawla, N., et al., "SMOTE: Synthetic Minority Over-sampling Technique," Journal of Artificial Intelligence Research, vol. 16, 2002, pp. 321-357.
Cloudshield, Inc., "Lawful Intercept Next-Generation Platform," 2009, 6 pages.
Coffman, T., et al., "Graph-Based Technologies for Intelligence Analysis," CACM, Mar. 2004, 12 pages.
Conti, M., et al., "Can't You Hear Me Knocking: Identification of User Action on Android Apps via Traffic Analysis," arXiv.org>cs>arXiv:1407.7844, Cornell University 2014, 8 pages.
Corney, M., et al. "Gender-Preferential Text Mining of E-mail Discourse," Proceedings of the 18the Annual Computer Security Applications Conference, 2002, 8 pages.
De Vel, O., et al., "Language and Gender Author Cohort Analysis of E-mail for Computer Forensics," Defence Science and Technology Organisation, Australia, 2002, 16 pages.
Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.
Dietrich, C.J., et al., "CoCoSpot: Clustering and recognizing botnet command and control channels using traffic analysis," 2012, pp. 475-486.

(56) References Cited

OTHER PUBLICATIONS

Eagle, N., et al., "Inferring friendship network structure by using mobile phone data," PNAS, vol. 106, No. 36, 2009, pp. 15274-15278.
Eslahi, M., "botAnalytics: Improving HTTP-Based Botnet Detection by Using Network Behavior Analysis system," Dissertation, Faculty of Computer Science and Information Technology, University of Malaya, 2010, 124 pages.
Estival, D., et al., "Author Profiling for English Emails," Proceedings of the 10th Conference of the Pacific Association for Computational Linguistics, 2007, pp. 263-272.
Fisk, Mike, et al., "Applying Fast String Matching to Intrusion Detection," Los Alamos National Laboratory and University of California San Diego, Jun. 1975, 22 pages.
FoxReplay Analyst, Fox Replay BV, http//www.foxreplay.com, Revision 1.0, Nov. 2007, 5 pages.
FoxReplay Analyst Product Brochure, Fox-IT BV, http//www.foxreplay.com, 2006, 2 pages.
Goldfarb, Eithan, "Mass Link Analysis: Conceptual Analysis," Jun. 24, 2007, Version 1.1, 21 pages.
Goswami, S., et al., "Stylometric Analysis of Bloggers' Age and Gender," Proceedings of the Third International ICWSM Conference, 2009, pp. 214-217.
Grolman, E., et al., "Transfer Learning for User Action Identification in Mobile Apps via Encrypted Traffic Analysis," IEEE Intelligent Systems, vol. 33, Issue 2, 2018, pp. 40-53.
Hanneke, S., et al., "Iterative Labeling for Semi-Supervised Learning," Tech. Rep. No. UIUCDCS-R-2004-2442, Computer Science Department, University of Illinois at Urbana-Champaign, 2004, 13 pages.
Jacob, G., et al., "JACKSTRAWS: Picking Command and Control Connections from Bot Traffic," Proceedings of the 20th USENIX Security Symposium, San Francisco, 2011, 16 pages.
Lakhina, A., et al., "Mining Anomalies Using Traffic Feature Distributions," SIGCOMM, 2005, pp. 217-228.
Lin, Z., et al., "Automatic Protocol Format Reverse Engineering through Context-Aware Monitored Execution," Proceedings of the Network and Distributed System Security Symposium, San Diego, California, 2008, 17 pages.
Liu, R-T., et al., "A Fast Pattern-Match Engine for Network Processor-based NIDS," Proceedings of the 20th International Conference on Information Technology (ITCC'04), 2006, 23 pages.
Livadas, C., et al., "Using Machine Learning Techniques to Identify Botnet Traffic," in 2nd IEEE LCN Workshop on Network Security (WoNS'2006), 2006, pp. 967-974.
Mohrehkesh, S., et al., "Demographic Prediction of Mobile User from Phone Usage," Proceedings Mobile Data Challenge by Nokia Workshop, Newcastle, United Kingdom, 2012, 4 pages.
Navarro, Gonzalo, et al., "Flexible Pattern Matching in Strings: Practical On-Line Search Algorithms for Texts and Biological Sequences," Cambridge University Press, 2002, 166 pages.
Netronome SSL Inspector Solution Overview White Paper, "Examining SSL-encrypted Communications," 2010, 8 pages.
Nigam, K., et al., "Analyzing the Effectiveness and Applicability of Co-training," Proceedings of the ninth international conference on Information and knowledge management (CIKM'00), 2000, pp. 86-93.
Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.
Rangel, F., et al., "Overview of the Author Profiling Task at PAN 2013," CLEF 2013 Evaluation Labs, 2013, 13 pages.
Rohde & Schwarz GmbH & Co. KG, "ACCESSNET-T, DMX-500 R2, Digital Mobile eXchange," Product Brochure, Secure Communications, Mar. 2000, 4 pages.
Rohde & Schwarz GmbH & Co. KG, "ACCESSNET-T IP," Product Brochure, Secure Communications, Jan. 2000, 4 pages.
Rohde & Schwarz GmbH & Co. KG, "R&S AllAudio Integrated Digital Audio Software," Product Brochure, Radiomonitoring & Radiolocation, Feb. 2000, 12 pages.
Rohde & Schwarz GmbH & Co. KG, "R&S AllAudio Integrierte digitale Audio-Software," Product Brochure, Feb. 2002, 12 pages.
Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.
Rohde & Schwarz GmbH & Co. KG, "R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.
Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.
Rohde & Schwarz GmbH & Co. KG, "Integrated Digital Audio Software R&S AllAudio," Specifications, 2000, 8 pages.
Rohde & Schwarz GmbH & Co. KG, "R&S RA-CM Continuous Monitoring Software," Product Brochure, Radiomonitoring & Radiolocation, Jan. 2001, 16 pages.
Rohde & Schwarz GmbH & Co. KG, "R&S RAMON COMINT/CESM Software," Product Brochure, Radiomonitoring & Radiolocation, Jan. 2000, 22 pages.
Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.
Saltaformaggio, B., et al., "Eavesdropping on Fine-Grained User Activities Within Smartphone Apps Over Encrypted Network Traffic," Proceedings of the 10th USENIX Conference on Offensive Technologies (WOOT'16), 2016, pp. 69-78.
Schulzrinne, H., et al., "RTP: A Transport Protocol for Real-Time Applications," Standards Track, Jul. 2003, 89 pages.
Sheng, Lei, et al., "A Graph Query Language and Its Query Processing," IEEE, Apr. 1999, pp. 572-581.
Soghoian, Christopher, et al., "Certified Lies: Detecting and Defeating Government Interception Attacks Against SSL," 2010, 19 pages.
Stamatatos, E., "Author identification: Using text sampling to handle the class imbalance problem," Science Direct, Information Processing and Management, vol. 44, 2008, pp. 790-799.
Svenson, Pontus, et al., "Social network analysis and information fusion for anti-terrorism," CIMI, 2006, 8 pages.
Thonnard, O., et al., "Actionable Knowledge Discovery for Threats Intelligence Support Using a Multi-Dimensional Data Mining Methodology," 2008 IEEE International Conference on Data Mining Workshops, 2008, pp. 154-163.
Tongaonkar, Alok S., "Fast Pattern-Matching Techniques for Packet Filtering," Stony Brook University, May 2004, 44 pages.
Verint Systems Inc., "Mass Link Analysis: Conceptual Analysis," Jun. 2007, 21 pages.
Verint Systems Inc., "Mass Link Analysis: Solution Description," Dec. 2008, 16 pages.
Wang, H., et al., "NetSpy: Automatic Generation of Spyware Signatures for NIDS," Proceedings of the 22nd Annual Computer Security Applications Conference, Miami Beach, Florida, Dec. 2006, ten pages.
Yu, Fang, et al., "Fast and Memory-Efficient Regular Expression Matching for Deep Packet Inspection," ANCS'06, San Jose, California, Dec. 3-5, 2006, 10 pages.
Yu, Fang, et al., "Gigabit Rate Packet Pattern-Matching Using TCAM," Proceedings of the 12th IEEE International Conference on Network Protocols (ICNP'04), 2004, 10 pages.

\* cited by examiner

SYSTEM AND METHOD FOR GENERATING DATA SETS FOR LEARNING TO IDENTIFY USER ACTIONS

FIELD OF THE DISCLOSURE

The present disclosure relates generally to the field of communication monitoring, and specifically, to the monitoring of encrypted traffic over computer networks.

BACKGROUND OF THE DISCLOSURE

In some cases, law-enforcement or security agencies may wish to monitor communication over a computer network, such as the Internet, in order to identify activities taking place on the computer network. A challenge in doing so, however, is that many applications use encrypted protocols, such that the traffic exchanged by these applications is encrypted. Examples of such applications include Gmail, Facebook, and Twitter. Examples of encrypted protocols include the Secure Sockets Layer (SSL) protocol and the Transport Layer Security (TLS) protocol.

Conti, Mauro, et al. "Can't you hear me knocking: Identification of user actions on Android apps via traffic analysis," Proceedings of the 5th ACM Conference on Data and Application Security and Privacy, ACM, 2015, which is incorporated herein by reference, describes an investigation as to which extent it is feasible to identify the specific actions that a user is doing on mobile apps, by eavesdropping on their encrypted network traffic.

SUMMARY OF THE DISCLOSURE

There is provided, in accordance with some embodiments of the present disclosure, a system, for use with a monitoring device intermediating an exchange, between an application and a server, of encrypted communication that was generated in response to one or more actions performed by a user of the application. The system includes a network interface, and at least one processor, configured to receive from the monitoring device, via the network interface, the encrypted communication, and corresponding unencrypted communication that was derived, by the monitoring device, from the encrypted communication, to ascertain, based on the unencrypted communication, and without decrypting the encrypted communication, respective types of the actions, and to apply labels, which indicate the respective types of the actions, to the encrypted communication, by storing features of the encrypted communication in association with the labels.

In some embodiments, the encrypted communication includes a plurality of encrypted blocks, each of the encrypted blocks including at least a first group of packets sent from the application to the server, and a second group of packets sent from the server to the application in response to the first group of packets, the unencrypted communication includes a plurality of unencrypted blocks, each of the unencrypted blocks including at least a first group of packets sent from the application to the server, and a second group of packets sent from the server to the application in response to the first group of packets, and the processor is configured to ascertain the respective types of the actions by:

ascertaining a correspondence between the encrypted blocks and the unencrypted blocks, and based on the correspondence, ascertaining, for each encrypted block of the encrypted blocks, the type of the action in response to which the encrypted block was generated.

In some embodiments, the processor is configured to apply the labels by storing features of each encrypted block of the encrypted blocks in association with a respective one of the labels that indicates the type of the action in response to which the encrypted block was generated.

In some embodiments, the processor is further configured to separate the encrypted communication into the encrypted blocks, based on respective durations of time between successive pairs of the encrypted blocks being greater than a threshold.

In some embodiments, the processor is configured to ascertain that any particular one of the encrypted blocks corresponds to a particular one of the unencrypted blocks, based on a duration of time between the particular one of the encrypted blocks and the particular one of the unencrypted blocks being less than a threshold.

In some embodiments, the processor is configured to ascertain the correspondence between the encrypted blocks and the unencrypted blocks by comparing respective durations of the encrypted blocks to respective durations of the unencrypted blocks.

In some embodiments, the processor is configured to ascertain the correspondence between the encrypted blocks and the unencrypted blocks by comparing respective amounts of data in the encrypted blocks to respective amounts of data in the unencrypted blocks.

In some embodiments, the processor is further configured to learn, using the stored features and labels, to ascertain, for subsequent encrypted communication exchanged between the application and the server, respective types of actions in response to which the subsequent encrypted communication was generated.

In some embodiments, the processor is further configured:

to form a plurality of clusters, each of the clusters including (i) at least one representative block of encrypted communication received from the monitoring device, and (ii) other encrypted communication, and to apply, to all of the encrypted communication in each cluster of the clusters, a label, of the labels, applied to the representative block for the cluster.

In some embodiments, the processor is configured to form the plurality of clusters by clustering blocks of the other encrypted communication based on respective communication patterns exhibited by the blocks.

There is further provided, in accordance with some embodiments of the present disclosure, a method for use with a monitoring device intermediating an exchange, between an application and a server, of encrypted communication that was generated in response to one or more actions performed by a user of the application. The method includes receiving, from the monitoring device, the encrypted communication, and corresponding unencrypted communication that was derived, by the monitoring device, from the encrypted communication, using a processor, automatically ascertaining respective types of the actions, based on the unencrypted communication, and without decrypting the encrypted communication, and applying labels, which indicate the respective types of the actions, to the encrypted communication, by storing features of the encrypted communication in association with the labels.

The present disclosure will be more fully understood from the following detailed description of embodiments thereof, taken together with the drawings, in which:

DETAILED DESCRIPTION OF EMBODIMENTS

Overview

As described above, many applications use encrypted protocols. An objective, therefore, is to automatically learn to identify user actions based on various properties, and/or recurring patterns, of the encrypted traffic exchanged with these applications. Such automatic learning may be performed using a supervised machine-learning algorithm.

A challenge, however, is that supervised machine-learning algorithms require a large, labeled learning set, in which a plurality of observations—each of which includes a respective set, or vector, of features—are paired with respective "ground truth" labels. A learning set for identifying user actions, for example, may include feature-vectors that include any relevant features related to the numbers of packets, the sizes of the packets, the timing of the packets, and/or any other relevant properties of the observed flows, along with corresponding labels that describe the user actions that caused the flows to be generated. (For example, for the Gmail application, the labels may include "send mail," "delete mail," etc.)

One approach to generating a learning set for user-action identification is for at least one human or computer-simulated user to repeatedly perform various actions for each of the applications of interest (e.g., Gmail, Facebook, Twitter, etc.). Following each of these actions, the encrypted bidirectional flow of traffic may be captured, and then features of the flow may be stored together with a label provided by the real or computer-simulated user.

There are several drawbacks, however, to this approach. First, it may be overly cumbersome for a real user to manually label each performed action, and there is a risk that packets may be incorrectly labeled, due to human error. Although, as described above, a computer-simulated user may perform the user actions and the labeling thereof, the development of an appropriate computer-simulated user presents its own challenges. For example, even if the necessary time and resources are available for such a project, it may be difficult to develop a simulated user that is capable of mimicking the natural usage pattern of a human.

Embodiments described herein therefore provide improved systems and methods for generating appropriate data sets for learning to identify user actions.

In typical embodiments, a user uses one or more applications in a normal, natural manner, over a suitable period of time. As the user uses the applications, a monitoring device, acting as a "man-in-the-middle," intermediates the exchange of encrypted communication between the applications and the servers that serve the applications. (Typically, this user agrees to be thus monitored.) In other words, for each flow of communication from an application to a server, the monitoring device receives encrypted communication from the application, decrypts the communication, re-encrypts the communication, and then passes the re-encrypted communication to the server. Similarly, for each flow of communication from a server to an application, the monitoring device receives encrypted communication from the server, decrypts the communication, re-encrypts the communication, and then passes the re-encrypted communication to the application.

The monitoring device thus obtains, for each action performed by the user, two corresponding (bidirectional) flows of communication: an encrypted flow, and an unencrypted flow. Since the unencrypted flow indicates the type of action that was performed by the user, the correspondence between the encrypted flow and the unencrypted flow may be used to automatically label the encrypted flow, without decrypting the encrypted flow. (In other words, using the unencrypted communication, the type of action that generated the encrypted flow may be automatically ascertained.)

For example, a particular unit of encrypted communication may be labeled as a "tweet" (performed on the Twitter application), in response to the corresponding block of unencrypted communication indicating a tweet action. Features of the encrypted communication—e.g., features relating to the number of packets in the flow, the sizes of the packets, the timing of the packets, and/or other features of the flow—may then be stored in association with the label.

In this manner, an appropriately-sized learning set may be automatically generated for each application of interest, without any involvement of the user beyond the user's normal application usage. (To further increase the size and/or diversity of each learning set, the monitoring device may monitor the usage of the application by multiple users.) Based on each learning set, a machine-learning algorithm may then learn a classifier that is capable of automatically classifying, or "labeling," future observations of encrypted communication. Such classification may be used, for example, for law-enforcement, security, or social-compliance purposes. For example, if a particular incriminating, threatening, or offensive message is anonymously posted to the Internet at a particular time, a processor may search for encrypted "post" traffic that was communicated at the same time, and identify the origin of this traffic as the origin of the post.

SYSTEM DESCRIPTION

Introduction

Figure 1:
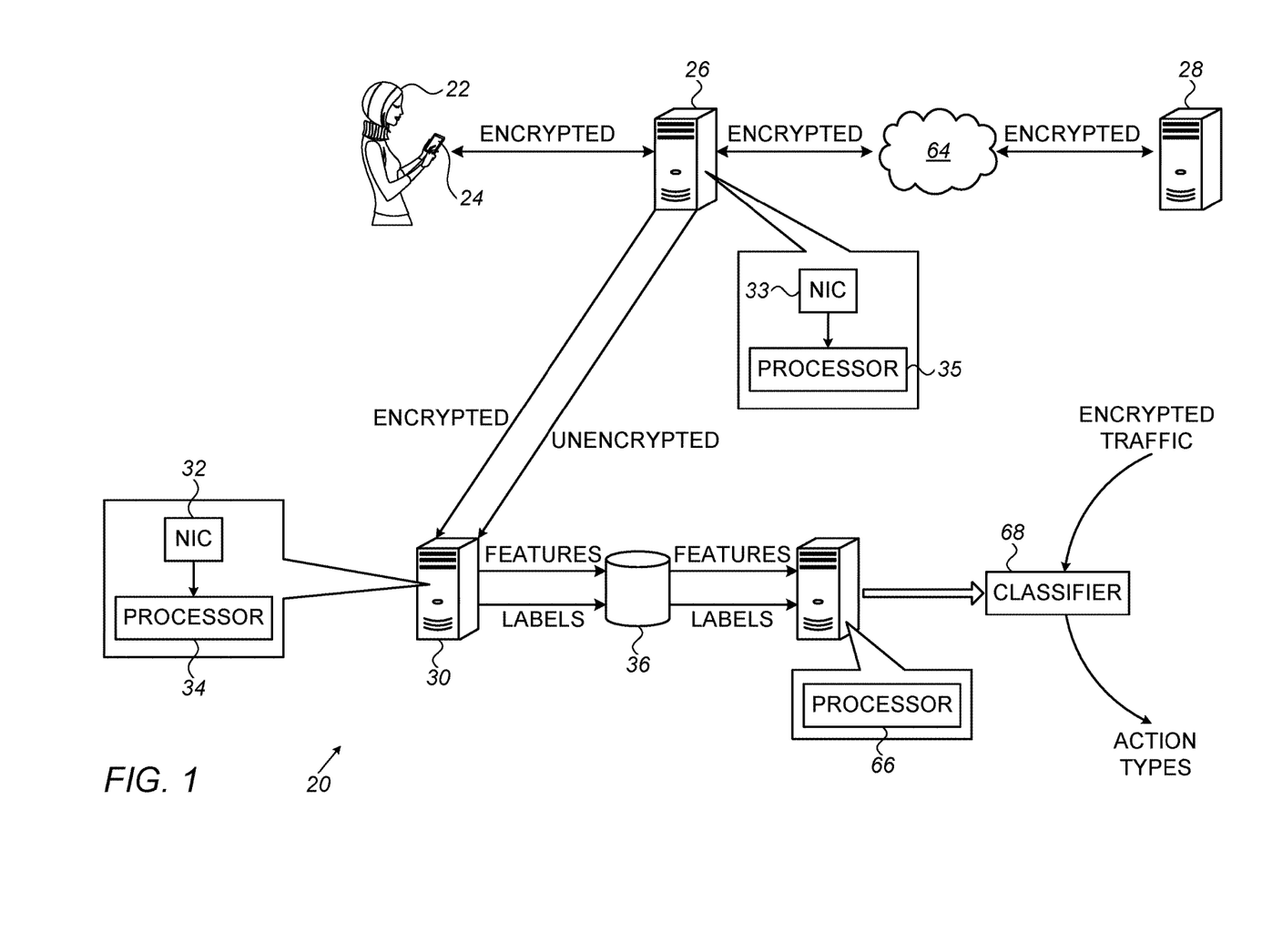
FIG. 1 is a schematic illustration of a system for constructing a learning set, in accordance with some embodiments of the present disclosure.

Reference is initially made to FIG. 1, which is a schematic illustration of a system 20 for constructing (or "generating") a learning set, in accordance with some embodiments of the present disclosure. System 20 comprises a monitoring device 26, configured to intermediate communication exchanged, over a network 64, between a client device 24 (such as a smartphone, laptop or desktop computer, or any other network-enabled device), and an application server 28. Monitoring device 26, which may also be referred to as a "man-in-the-middle" ("MitM"), comprises a processor 35 and a network interface, which may comprise, for example, a network interface controller (NIC) 33, configured to send and receive communication via network 64. Processor 35 sends and receives communication via the network interface.

In intermediating an exchange of communication, monitoring device 26 appears to device 24 as application server 28, and to application server 28 as device 24. Thus, encrypted communication sent by device 24 and intended for application server 28 is received by the monitoring device, as if the monitoring device were the application server. Processor 35 decrypts the communication, thus deriving unencrypted communication from the encrypted communication, re-encrypts the communication, and then sends the re-encrypted communication to application server 28, as if the monitoring device were the client device. Similarly, encrypted communication sent by server 28 and intended for device 24 is received by the monitoring device, as if the monitoring device were the client device. Processor 35 decrypts the communication, thus deriving unencrypted communication from the encrypted communication, re-encrypts the communication, and then sends the re-encrypted communication to the client device, as if the monitoring device were the application server. In some embodiments, for example, monitoring device 26 is an SSL man-in-the-middle (MitM).

Typically, the user 22 of the client device consents to be monitored by monitoring device 26. Further to receiving the user's consent, client device 24 is configured for intermediation by the monitoring device. For example, a certificate may be installed on client device 24, this certificate allowing the monitoring device to intermediate communication exchanged with a web browser running on the client device. Alternatively or additionally, specially-configured (i.e., "hacked") versions of particular applications may be installed on the client device, such that communication exchanged by these applications is intermediated by the monitoring device.

As depicted in FIG. 1, monitoring device 26 typically resides between the client device and network 64. In some embodiments, the monitoring device is physically coupled to the client device.

System 20 further comprises a processor 34, which is configured to construct one or more learning sets, based on data received from monitoring device 26. Processor 34 may be located, for example, on a server 30. The monitoring device and processor 34 are configured to communicate with one another over network 64, and/or over any other suitable network. Data are received, by processor 34, from the monitoring device via a network interface, which may comprise, for example, a network interface controller (NIC) 32. The processor processes these data, as described in detail below, and then stores the resulting output, typically in a database 36. Database 36 may be external to server 30, as shown in the figure, or alternatively, internal to server 30.

More specifically, upon user 22 performing various actions using a particular application running on device 24, the application generates encrypted traffic (or "encrypted communication"), and sends this encrypted traffic to the monitoring device. The monitoring device passes the encrypted traffic, along with the corresponding unencrypted traffic (or "unencrypted communication") derived from the encrypted traffic, to processor 34. Similarly, upon application server 28 responding to the application, the monitoring device passes the encrypted traffic from the application server, along with the corresponding unencrypted traffic, to processor 34. (Alternatively, the processor may receive the encrypted traffic directly from the application and/or the server, and/or via a separate network tap monitoring the communication between the application and the application server.) Processor 34 then extracts features of the encrypted traffic, along with labels for the encrypted traffic, derived from the unencrypted traffic, that indicate the respective types of actions in response to which the encrypted traffic was generated. The processor then stores these features and labels, in association with each other, in the database.

For example, upon the user performing a "post" action on Facebook, the Facebook application may generate encrypted traffic that contains details of the post, and pass this traffic, via the monitoring device, to the Facebook server. The Facebook server, in turn, upon receiving this traffic, may generate appropriate encrypted traffic (e.g., such as to acknowledge receipt of the post), and send this traffic, via the monitoring device, to the application. The processor thus obtains the encrypted "post" traffic and response thereto, along with the corresponding unencrypted traffic. From the unencrypted traffic, processor 34 ascertains that the encrypted traffic was generated in response to a "post" action. The processor thus applies a "post" label to the encrypted traffic, and stores this label, in association with extracted features of the encrypted traffic (i.e., the "observation"), in the database.

In some embodiments, more than one user may be monitored in the above-described manner, such as to generate a larger and/or more diverse learning set. (If necessary, more than one monitoring device may be used.) Using techniques described herein, a respective learning set may be constructed for each relevant application, each learning set covering any number of relevant types of actions.

Upon a particular learning set for a particular application containing a sufficient number of labeled observations, another processor 66 (or processor 34) retrieves the learning set from database 36, and applies a suitable machine-learning algorithm (e.g., a decision-tree algorithm or support-vector-machine algorithm) to the learning set. (As known in the art, the labeled observations may be divided into various sets, such as a training set, testing set, and validation set. The term "learning set," as used herein, generally refers to the full collection of labeled observations, not only to the training set.) The machine-learning algorithm thus learns a classifier 68, which is capable of "classifying," i.e., labeling, encrypted traffic exchanged with the application, based on the relevant features of the encrypted traffic. Subsequently, processor 66 (or another processor) may use the classifier to label encrypted traffic, i.e., deduce the types of user actions in response to which the encrypted traffic was generated.

For example, processor 66 may learn a classifier for the Facebook application. Subsequently, a subject of interest may use Facebook to exchange encrypted communication with the Facebook server. Monitoring device 26, or another network tap, may pass this communication to processor 66, or to another processor configured to use the learned classifier. By applying the classifier to the encrypted communication, it may be ascertained that the encrypted communication was generated in response to a "post" action. This information may be helpful in monitoring the subject of interest. For example, if the subject of interest is a suspected terrorist, and a terrorism-related post appeared on Facebook at the same time as the encrypted communication was generated, it may be inferred that the subject of interest is likely responsible for the terrorism-related post.

In general, each of processor 34, processor 35, and processor 66 may be embodied as a single processor, or as a cooperatively networked or clustered set of processors. Each of these processors is typically a programmed digital computing device comprising a central processing unit (CPU), random access memory (RAM), non-volatile secondary storage, such as a hard drive or CD ROM drive, network interfaces, and/or peripheral devices. Program code, including software programs, and/or data are loaded into the RAM for execution and processing by the CPU and results are generated for display, output, transmittal, or storage, as is known in the art. The program code and/or data may be downloaded to the computer in electronic form, over a network, for example, or it may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein.

Implementation Details

Upon receiving encrypted communication from the monitoring device, the processor first ascertains the application with which the communication was exchanged. In some cases, such ascertainment may be based on a domain name that appears in the communicated packets. (Such information is typically not encrypted.) For example, based on the domain name "facebook.com," the processor may infer that the communication was exchanged with the Facebook application. In the event that a domain handles multiple services, the processor may ascertain the application from a Server Name Indication (SNI) within the relevant TLS request. If the application is one for which a learning set is desired, the processor processes the communication, as described in detail below. Otherwise, the processor discards the communication. (In other words, the processor filters the communication received from the monitoring device, based on the application(s) of interest.)

Next, if necessary, the processor ascertains the correspondence between the encrypted communication and the unencrypted communication, by matching each unit of unencrypted communication with a respective unit of encrypted communication that was exchanged with the same application as was the unencrypted communication. (Alternatively, the processor may match each unit of encrypted communication with a respective unit of unencrypted communication.) The processor then labels each unit of encrypted communication such as to reflect the type of user action that is indicated in the corresponding unit of unencrypted communication.

Figure 2:
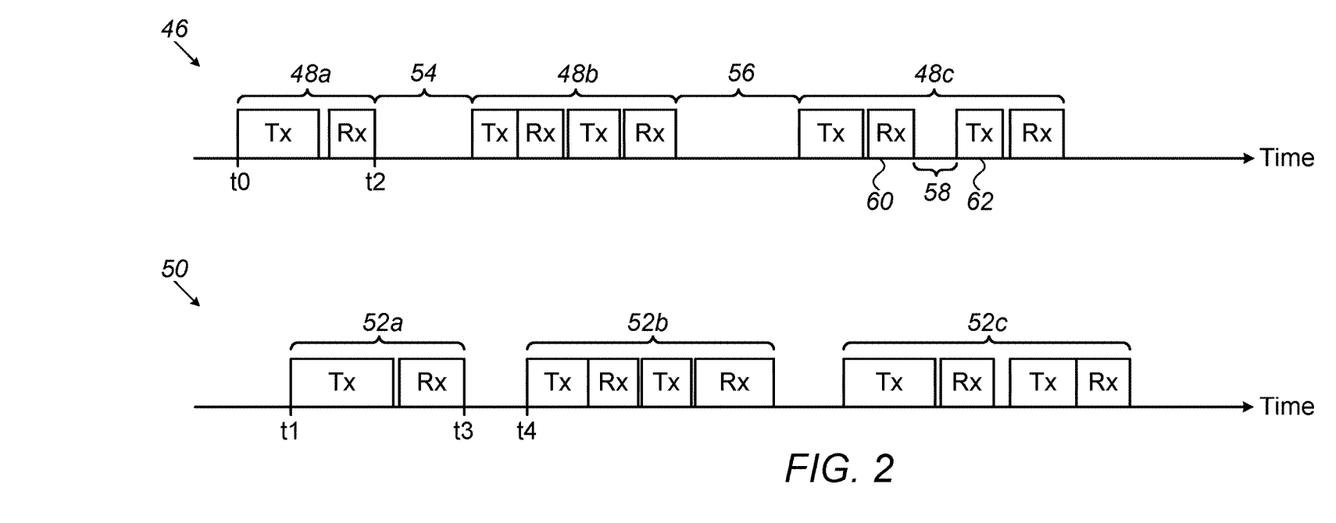
FIG. 2 is a schematic illustration of a block-matching operation, in accordance with some embodiments of the present disclosure.

In this regard, reference is now made to FIG. 2, which is a schematic illustration of a block-matching operation, in accordance with some embodiments of the present disclosure. FIG. 2 shows a first timeline marking the times at which units of unencrypted communication 46 were received by processor 34, and a second timeline marking the times at which units of encrypted communication, from which the monitoring device derived the unencrypted communication, were received by the processor. Each "Tx" box in FIG. 2 represents a group of one or more "transmit" packets that were sent from the application to the application server, while each "Rx" box represents a group of one or more "receive" packets that were sent from the application server to the application in response to the Tx box. Typically, the processor identifies each packet as a transmit packet or a receive packet, based on the (unencrypted) source and destination port numbers that appear in the packet. In the Hypertext Transfer Protocol Secure (HTTPS) protocol, for example, the port number 443 always indicates the server; thus, the packet may be identified as a Tx or Rx packet, based on whether the port number 443 appears as the source or destination.

In some embodiments, the monitoring device is configured to indicate to the processor, explicitly or implicitly, the correspondence between the encrypted communication and the unencrypted communication. For example, the monitoring device may label each unencrypted group of packets with an identifier that corresponds to that of the encrypted group of packets from which the unencrypted group of packets was derived. Alternatively, for example, the monitoring device may send, to the processor, each unencrypted group of packets immediately after the encrypted group of packets from which the unencrypted group of packets was derived, such that the processor deduces, from the times at which the groups of packets were sent, the correspondence between the groups.

Typically, however, the monitoring device sends the communication to the processor, without indicating the correspondence between the encrypted and unencrypted communication. The processor must therefore ascertain the correspondence. To do so, the processor first separates the communication—both encrypted and unencrypted—into units referred to herein as "blocks," each of which contains one or more pairs of Tx and Rx groups. (Each of these groups may contain any number of packets.) Typically, each block corresponds to a single user action; in other words, typically, the transmit (Tx) portion(s) of the block and the receive (Rx) portion(s) of the block were generated, collectively, in response to a single user action having been performed. Unencrypted communication 46 includes three such blocks: (i) a first block 48a, including a single Tx-Rx pair, (ii) a second block 48b, including two Tx-Rx pairs, and (iii) a third block 48c, including two Tx-Rx pairs. Similarly, encrypted communication 50 includes three such blocks: (i) a first block 52a, including a single Tx-Rx pair, (ii) a second block 52b, including two Tx-Rx pairs, and (iii) a third block 52c, including two Tx-Rx pairs.

To separate the communication into blocks, the processor typically looks for periods of "quiet time" that are sufficiently long such as to indicate a lull in user activity. That is, the separation into blocks is based on the respective durations of time between successive pairs of the blocks being greater than a threshold. (Any suitable threshold may be used; as a purely illustrative example, such a threshold may have a value of between 0.5 and 0.8 seconds, e.g., 0.65 seconds.) For example, block 48b is separated from block 48a, since the duration 54 between block 48a and block 48b is greater than the threshold. Likewise, the duration 56 between block 48b and block 48c is greater than the threshold, such that block 48c is separated from block 48b. On the other hand, the duration 58 between Rx group 60 and Tx group 62 is less than the threshold, such that the Tx-Rx pair to which Tx group 62 belongs is determined to belong to block 48c, rather than to a separate block.

Although FIG. 2 does not mark the durations between the blocks in encrypted communication 50, it is noted that the processor typically also separates the encrypted communication into blocks, using the above-described technique. The threshold used for encrypted-block separation is typically the same as the threshold used for the unencrypted communication.

Next, the processor matches each unencrypted block to the corresponding encrypted block from which the unencrypted block was (or is at least likely to have been) derived, or vice versa. In ascertaining that a given unencrypted block corresponds to a particular encrypted block, the processor typically performs one or more of the following comparisons:

(a) The processor may compare the duration of time between the unencrypted block and the encrypted block to a particular threshold. In this context, the duration of time between two blocks may refer to any one or more of (i) the difference between the respective times at which the respective first packets of the blocks were sent, (ii) the difference between the respective times at which the respective last packets of the blocks were sent, (iii) the difference between the respective times at which the respective first packets of the blocks were received, (iv) the difference between the respective times at which the respective last packets of the blocks were received, and (v) any other durations that are similar to, or derived from, the above (e.g., an average of two or more of the above). Since it is assumed that if, indeed, the unencrypted block was derived from the encrypted block, the two blocks should have been sent and/or received at similar times, the processor may use the closeness in time between the two blocks as an indicator that the two blocks correspond to one another. Any suitable threshold may be used for this comparison; as a purely illustrative example, the threshold may be between 0.5 and 0.8 seconds, e.g., 0.65 seconds.

For example, FIG. 2 shows that the first packet of block 48a was received by the processor at a time t0, while the first packet of block 52a was received by the processor at a time t1. To establish that block 48a corresponds to block 52a, or at least increase the likelihood of such a correspondence, the processor may verify that t1-t0 is less than a suitable threshold.

Alternatively or additionally to comparing the duration to a threshold, the processor may compare the duration to other durations, in order to find the "best match" for a block. For example, block 52a is a better match for block 48a than is block 52b, which was received at a time t4, in that the duration t1-t0 between block 48a and block 52a is less than the duration t4-t0.

(b) The processor may compare the duration of the encrypted block to the duration of the unencrypted block. In this context, the duration of a block may refer to any one or more of (i) the difference between the respective times at which the first and last packets of the block were sent, (ii) the difference between the respective times at which the first and last packets of the block were received, and (iii) any other durations that are similar to, or derived from, the above (e.g., an average of the above). Although, typically, an encrypted block is larger than—and therefore has a longer duration than—the corresponding unencrypted block, it is assumed that the durations of the two blocks should be similar. The processor may therefore use the similarity between the durations (i.e., the fact that the difference between the durations is less than a threshold) as an indicator that the two blocks correspond to one another.

For example, the processor may compute the absolute or normalized difference between the durations, and compare this difference to a suitable threshold. (An example threshold for an absolute-difference comparison is between 0.5 and 0.8 seconds, such as 0.65 seconds.) Alternatively or additionally, the processor may compute the ratio between the durations, and check that this ratio falls within a given range, i.e., between a lower threshold and an upper threshold.

For example, FIG. 2 shows the last packet in block 48a being received at a time t2, and the last packet in block 52a being received at a time t3. The processor may therefore compare any one or more of the following quantities to respective thresholds: (i) the absolute difference (t3−t1)−(t2−t0), (ii) the normalized difference ((t3−t1)−(t2−t0))/(t2−t0), and (iii) the ratio (t3−t1)/(t2−t0).

(c) The processor may compare the amount of data (e.g., the number of bytes, frames, and/or packets) in the encrypted block to the amount of data in the unencrypted block. The rationale for this comparison is similar to the rationale for the duration-comparison described above. As described above, the processor may compute any suitable difference or ratio, and compare the computed quantity, or quantities, to appropriate threshold(s). For example, the processor may compute the ratio between the number of bytes in the encrypted block and the number of bytes in the unencrypted block, and check that this ratio falls between a lower threshold and an upper threshold.

Further to performing one or more of the above comparisons, the processor may compute a likelihood that the unencrypted block corresponds to the encrypted block. If the computed likelihood is sufficiently high, the processor ascertains that the unencrypted block corresponds to the encrypted block. For example, FIG. 2 indicates, by the three downward-and-rightward-facing arrows, that the processor has ascertained that unencrypted blocks 48a-c correspond to, respectively, encrypted blocks 52a-c.

Although, in FIG. 2, each block of unencrypted communication is shown being received by the processor prior to the corresponding block of encrypted communication, it is noted that the correspondence between an unencrypted block and an encrypted block may be ascertained regardless of the order in which the blocks were received. Moreover, as noted above, the processor may either look for a corresponding encrypted block for each unencrypted block, or, alternatively, look for a corresponding unencrypted block for each encrypted block.

Upon establishing that an unencrypted block corresponds to a particular encrypted block, the processor infers, based on information contained in the unencrypted block, the type of user action in response to which the encrypted block was generated. For example, if unencrypted block 48a indicates a "send mail" user action, the processor may infer that corresponding encrypted block 52a was generated in response to a "send mail" action.

To extract the type of user action from the unencrypted communication, the processor may use any suitable method. For example, the processor may search the content of the unencrypted packets for appropriate fieldnames that are known to indicate various types of user actions. Examples of such fieldnames include "post status," which precedes the text of a Facebook post, and "msg_txt," which precedes the text of a message in some messaging applications. In some embodiments, processor 34, or another processor, automatically validates and updates these search terms, by generating communication with some arbitrary, given content, and then finding, in the generated communication, the fieldnames that precede this content. For example, the processor may post a "Hello world" message to Facebook, and then find the "post status" fieldname that precedes the "Hello world" message.

In some embodiments, processor 34 supplements the learning set by labeling other encrypted communication that is received, from monitoring device 26 and/or other sources, without corresponding unencrypted communication. To perform such labeling, the processor first utilizes unsupervised learning techniques (e.g., the k-means algorithm) to cluster the blocks of encrypted communication, based on any suitable features of the blocks, such as communication patterns exhibited by the blocks. For example, a first block exhibiting a pattern of N Tx packets followed by M Rx packets may be clustered with another block exhibiting the same or similar pattern; this clustering is based on the assumption that blocks sharing similar patterns of communication are likely to have been generated in response to the same type of user action. (As an example of a "similar" pattern, the processor may cluster, with the first block, any block that includes N+A Tx packets followed by M+B Rx packets, where A and B are any suitable positive or negative integers.)

The processor thus forms a plurality of clusters, each of the clusters including at least one representative block of encrypted communication received from the monitoring device, and any number of blocks of the other encrypted communication. Since, for each cluster, all of the blocks in the cluster are assumed to have been generated in response to the same type of user action, the processor may apply the label that is applied to the representative block to all of the encrypted communication in the cluster. For example, upon ascertaining that a representative block for a cluster indicates a "tweet" action, the processor may associate each of the other blocks in the cluster with the "tweet" action, even though these other blocks were received without any corresponding unencrypted communication. The processor may thus generate large learning sets based on communication received from any number of users, without necessarily requiring that the monitoring device intermediate all of this communication.

(To obviate any confusion, it is noted that all communication generated in response to a particular action type does not necessarily exhibit the same Tx-Rx pattern. The supervised learning that follows the acquisition of the learning set learns classification rules that are based on a richer set of features, such that other encrypted communication may be properly labeled, even if such communication did not fall into one of the previously-identified clusters.)

Typically, each block of communication that is segregated by the processor corresponds to a single, entire user action. In some cases, however, the processor may see that two or more blocks are associated with the same user action. In such a case, the processor may join the blocks into a single block. For example, if block 48*b* were seen to be associated with the beginning of a "send mail" action, and block 48*c* were seen to be associated with the end of the same "send mail" action, the processor may redefine block 48*b* to also include block 48*c*. Similarly, if the processor sees that a particular block is associated with more than one user action, the processor may separate the block into smaller blocks.

Blocks—whether encrypted or unencrypted—for which a match cannot be found are ignored by the processor, i.e., they are not used by the processor to build the learning set. Similarly, blocks that have an unequal amount of Tx and Rx groups—e.g., two Tx groups, but only one Rx group—are ignored. Likewise, blocks that do not begin with a Tx packet are ignored.

Figure 3:
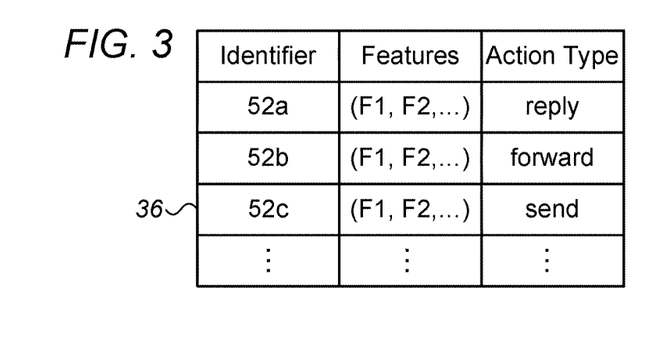
FIG. 3 is a schematic illustration of information stored in a database, in accordance with some embodiments of the present disclosure.

Further to ascertaining the types of user actions in response to which the encrypted blocks were generated (i.e., further to labeling the encrypted blocks), features of the encrypted blocks are stored in association with the labels that indicate the types of user actions. In this regard, reference is now made to FIG. 3, which is a schematic illustration of information stored in database 36, in accordance with some embodiments of the present disclosure. By way of example, FIG. 3 shows multiple entries in database 36, corresponding to respective encrypted blocks. Each of the entries includes: (i) an identifier of the block, (ii) an "observation," including features of the block, which may be represented as a vector of features F1, F2, etc. that were extracted from the block, and (iii) a label that indicates the type of user action in response to which the block was generated. (It is noted that FIG. 3 shows only one way, of many possible ways, in which the processor may store the features and labels.)

Using the stored features and labels (which together constitute a learning set), the processor automatically learns to ascertain, for subsequent encrypted communication exchanged between the application and the server, respective types of actions in response to which the subsequent encrypted communication was generated. For example, the processor may learn that a particular combination of features, when observed in an encrypted block, indicates that the encrypted block was generated in response to a "reply" action. Subsequently, upon the processor (or another processor employing the learned classifier) observing this combination of features in a block of encrypted communication, the processor may automatically label the block as a "reply" block.

As noted above, the techniques described above with respect to FIGS. 2-3 may be performed separately for each application of interest. In some embodiments, the processor builds respective learning sets for a plurality of applications, in parallel to each other, as communication is received from the monitoring device. Typically, however, the processor first builds a learning set for the first application of interest, and only then moves on to the next application of interest.

Figure 4:
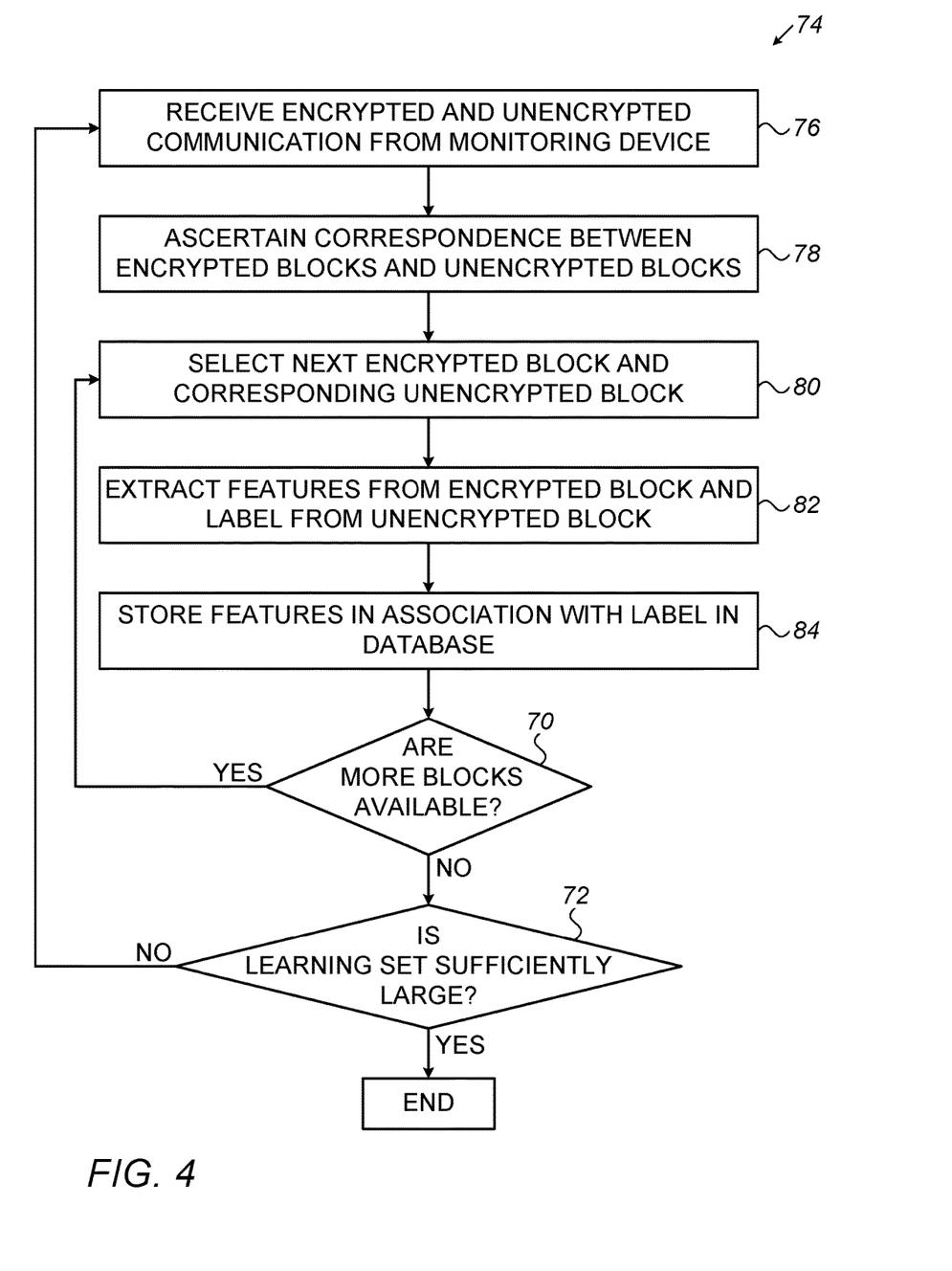
FIG. 4 is a flow diagram for a method for generating a learning set, in accordance with some embodiments of the present disclosure.

Reference is now made to FIG. 4, which is a flow diagram for a method 74 for generating a learning set, in accordance with some embodiments of the present disclosure. Method 74 is performed by processor 34, as described above with reference to FIGS. 1-3, for each application of interest.

Method 74 begins at a receiving step 76, at which encrypted and unencrypted communication is received, from the monitoring device, by processor 34. (For simplicity, it is assumed that the communication received at receiving step 76 was exchanged only with a single application of interest, and not with any other application. As described above, processor 34 may employ any suitable filter in filtering the communication by application.) At a matching step 78, the processor separates the communication into blocks, and then ascertains the correspondence between the encrypted blocks and unencrypted blocks. (During matching step 78 and subsequent steps of method 74, the processor may continue to receive communication from the monitoring device.) Subsequently, at a selecting step 80, the processor selects the next pair of corresponding blocks for processing. Then, at an extracting step 82, the processor extracts features from the selected encrypted block, and a label from the selected unencrypted block. Subsequently, at a storing step 84, the processor stores the extracted features, in association with the label, in database 36.

The processor then checks, at a first checking step 70, whether more pairs of corresponding blocks are available. If yes, the processor returns to selecting step 80, and selects the next pair of blocks. Otherwise, the processor checks, at a second checking step 72, whether the generated learning set (containing the stored features and labels) is sufficiently large. For example, the processor may compare the number of observations in the set to a predetermined threshold, and/or may process input received from processor 66 as to the performance of the classifier that was learned from the data presently contained in the learning set. (If the learned classifier is performing well enough, there may be no need for further increasing the size of the learning set; otherwise, a further increase in size may be helpful.) If the learning set is sufficiently large, method 74 ends. Otherwise, the processor continues to receive, and process, communication received from the monitoring device.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, for use with a monitoring device intermediating an exchange, between an application and a server, of encrypted communication that was generated in response to one or more actions performed by a user of the application, the system comprising:
   a network interface; and
   at least one processor, configured:
      to receive from the monitoring device, via the network interface, the encrypted communication, and corresponding unencrypted communication that was derived, by the monitoring device, from the encrypted communication,
      to ascertain, based on the unencrypted communication, and without decrypting the encrypted communication, respective types of the actions, and
      to apply labels, which indicate the respective types of the actions, to the encrypted communication, by storing features of the encrypted communication in association with the labels.

2. The system according to claim 1,
   wherein the encrypted communication includes a plurality of encrypted blocks, each of the encrypted blocks including at least a first group of packets sent from the application to the server, and a second group of packets sent from the server to the application in response to the first group of packets,
   wherein the unencrypted communication includes a plurality of unencrypted blocks, each of the unencrypted blocks including at least a first group of packets sent from the application to the server, and a second group of packets sent from the server to the application in response to the first group of packets, and
   wherein the processor is configured to ascertain the respective types of the actions by:
      ascertaining a correspondence between the encrypted blocks and the unencrypted blocks, and
      based on the correspondence, ascertaining, for each encrypted block of the encrypted blocks, the type of the action in response to which the encrypted block was generated.

3. The system according to claim 2, wherein the processor is configured to apply the labels by storing features of each encrypted block of the encrypted blocks in association with a respective one of the labels that indicates the type of the action in response to which the encrypted block was generated.

4. The system according to claim 2, wherein the processor is further configured to separate the encrypted communication into the encrypted blocks, based on respective durations of time between successive pairs of the encrypted blocks being greater than a threshold.

5. The system according to claim 2, wherein the processor is configured to ascertain that any particular one of the encrypted blocks corresponds to a particular one of the unencrypted blocks, based on a duration of time between the particular one of the encrypted blocks and the particular one of the unencrypted blocks being less than a threshold.

6. The system according to claim 2, wherein the processor is configured to ascertain the correspondence between the encrypted blocks and the unencrypted blocks by comparing respective durations of the encrypted blocks to respective durations of the unencrypted blocks.

7. The system according to claim 2, wherein the processor is configured to ascertain the correspondence between the encrypted blocks and the unencrypted blocks by comparing respective amounts of data in the encrypted blocks to respective amounts of data in the unencrypted blocks.

8. The system according to claim 1, wherein the processor is further configured to learn, using the stored features and labels, to ascertain, for subsequent encrypted communication exchanged between the application and the server, respective types of actions in response to which the subsequent encrypted communication was generated.

9. The system according to claim 1, wherein the processor is further configured:
   to form a plurality of clusters, each of the clusters including (i) at least one representative block of encrypted communication received from the monitoring device, and (ii) other encrypted communication, and
   to apply, to all of the encrypted communication in each cluster of the clusters, a label, of the labels, applied to the representative block for the cluster.

10. The system according to claim 9, wherein the processor is configured to form the plurality of clusters by clustering blocks of the other encrypted communication based on respective communication patterns exhibited by the blocks.

11. A method for use with a monitoring device intermediating an exchange, between an application and a server, of encrypted communication that was generated in response to one or more actions performed by a user of the application, the method comprising:
   receiving, from the monitoring device, the encrypted communication, and corresponding unencrypted communication that was derived, by the monitoring device, from the encrypted communication;
   using a processor, automatically ascertaining respective types of the actions, based on the unencrypted communication, and without decrypting the encrypted communication; and
   applying labels, which indicate the respective types of the actions, to the encrypted communication, by storing features of the encrypted communication in association with the labels.

12. The method according to claim 11,
   wherein the encrypted communication includes a plurality of encrypted blocks, each of the encrypted blocks including at least a first group of packets sent from the application to the server, and a second group of packets sent from the server to the application in response to the first group of packets,
   wherein the unencrypted communication includes a plurality of unencrypted blocks, each of the unencrypted blocks including at least a first group of packets sent from the application to the server, and a second group of packets sent from the server to the application in response to the first group of packets, and
   wherein ascertaining the respective types of the actions comprises:
      ascertaining a correspondence between the encrypted blocks and the unencrypted blocks, and based on the correspondence, ascertaining, for each encrypted block of the encrypted blocks, the type of the action in response to which the encrypted block was generated.

13. The method according to claim 12, wherein applying the labels comprises applying the labels by storing features of each encrypted block of the encrypted blocks in association with a respective one of the labels that indicates the type of the action in response to which the encrypted block was generated.

14. The method according to claim 12, further comprising separating the encrypted communication into the encrypted blocks, based on respective durations of time between successive pairs of the encrypted blocks being greater than a threshold.

15. The method according to claim 14, wherein ascertaining the correspondence between the encrypted blocks and the unencrypted blocks comprises ascertaining that any particular one of the encrypted blocks corresponds to a particular one of the unencrypted blocks, based on a duration of time between the particular one of the encrypted blocks and the particular one of the unencrypted blocks being less than a threshold.

16. The method according to claim 14, wherein ascertaining the correspondence between the encrypted blocks and the unencrypted blocks comprises ascertaining the correspondence by comparing respective durations of the encrypted blocks to respective durations of the unencrypted blocks.

17. The method according to claim 14, wherein ascertaining the correspondence between the encrypted blocks and the unencrypted blocks comprises ascertaining the correspondence by comparing respective amounts of data in the encrypted blocks to respective amounts of data in the unencrypted blocks.

18. The method according to claim 11, further comprising, using the stored features and labels, automatically learning to ascertain, for subsequent encrypted communication exchanged between the application and the server, respective types of actions in response to which the subsequent encrypted communication was generated.

19. The method according to claim 11, further comprising:
- automatically forming a plurality of clusters, each of the clusters including (i) at least one representative block of encrypted communication received from the monitoring device, and (ii) other encrypted communication, and
- applying, to all of the encrypted communication in each cluster of the clusters, a label, of the labels, applied to the representative block for the cluster.

20. The method according to claim 19, wherein automatically forming the plurality of clusters comprises automatically forming the plurality of clusters by clustering blocks of the other encrypted communication based on communication patterns exhibited by the blocks.

* * * * *